United States Patent
Natarajan et al.

(10) Patent No.: US 7,391,728 B2
(45) Date of Patent: Jun. 24, 2008

(54) APPARATUS AND METHOD FOR IMPROVED FIBRE CHANNEL OVERSUBSCRIPTION OVER TRANSPORT

(75) Inventors: Sriram Natarajan, Sunnyvale, CA (US); Sharat Prasad, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 834 days.

(21) Appl. No.: 10/748,949

(22) Filed: Dec. 30, 2003

(65) Prior Publication Data

US 2005/0165968 A1 Jul. 28, 2005

(51) Int. Cl.
*H04L 12/26* (2006.01)
(52) U.S. Cl. .......................... 370/235; 370/252; 370/412
(58) Field of Classification Search ................. 370/229, 370/230, 230.1, 231, 235, 235.1, 252, 253, 370/412
See application file for complete search history.

(56) References Cited

U.S. PATENT DOCUMENTS

| | | | |
|---|---|---|---|
| 5,528,591 A * | 6/1996 | Lauer | 370/231 |
| 5,610,745 A | 3/1997 | Bennett | |
| 5,638,518 A | 6/1997 | Malladi | |
| 5,748,612 A * | 5/1998 | Stoevhase et al. | 370/230 |
| 5,894,481 A * | 4/1999 | Book | 370/412 |
| 6,240,096 B1 | 5/2001 | Book | |
| 6,393,489 B1 | 5/2002 | Sambamurthy et al. | |
| 6,925,058 B2 * | 8/2005 | Jones et al. | 370/235 |
| 7,031,258 B1 * | 4/2006 | Frisch et al. | 370/235 |
| 2003/0016683 A1 | 1/2003 | George et al. | |
| 2003/0091037 A1 | 5/2003 | Latif et al. | |
| 2004/0027987 A1 * | 2/2004 | Bergamasco et al. | 370/229 |
| 2004/0081108 A1 * | 4/2004 | Kloth et al. | 370/299 |
| 2004/0202155 A1 * | 10/2004 | Natarajan et al. | 370/360 |
| 2004/0202205 A1 * | 10/2004 | Sheth et al. | 370/539 |
| 2005/0030893 A1 * | 2/2005 | Dropps et al. | 370/229 |
| 2005/0163168 A1 * | 7/2005 | Sheth et al. | 370/537 |

FOREIGN PATENT DOCUMENTS

WO    WO 01/43328 A1    6/2001

OTHER PUBLICATIONS

"Fibre Channel Switch Fabric (FC-SW) Rev. 3.3", NCITS Working Draft Proposed American National Standard for Information Technology, Oct. 21, 1997.
"Fibre Channel Switch Fabric—2 (FC-SW-2) Rev. 5.3", NCITS Working Draft Proposed American National Standard for Information Technology, Jun. 26, 2001.
"Fibre Channel Framing and Signaling (FC-FS), Rev. 1.70", NCITS Working Draft Proposed American National Standard for Information Technology, Feb. 8, 2002.

* cited by examiner

*Primary Examiner*—Ricky Ngo
*Assistant Examiner*—Gary Mui
(74) *Attorney, Agent, or Firm*—Cindy Kaplan

(57) ABSTRACT

Oversubscription of Fibre Channel links over a transport network is provided. A transport interface according to the present invention may maintain a small ingress buffer in addition to the normal egress buffer. The ingress buffer is primarily used for oversubscription and the egress buffer is primarily used for flow control. Ready indications to multiple local Fibre Channel ports may be locally generated when flow control conditions permit and may be distributed among the local Fibre Channel ports in response to preconfigured bandwidth sharing weights. Transport network efficiency is achieved by statistical multiplexing without significant increase in buffer memory requirements or introduction of latency into the flow control mechanism.

22 Claims, 4 Drawing Sheets

APPARATUS AND METHOD FOR IMPROVED FIBRE CHANNEL OVERSUBSCRIPTION OVER TRANSPORT

STATEMENT OF RELATED APPLICATIONS

The present application is related to the subject matter of the following U.S. Patent Applications, U.S. patent application Ser. No. 10/166,213, filed on Jun. 10, 2002, entitled INTELLIGENT FLOW CONTROL MANAGEMENT TO EXTEND FIBRE CHANNEL LINK FULL PERFORMANCE RANGE; U.S. patent application Ser. No. 10/366,867, filed on Feb. 13, 2003, entitled FIBRE CHANNEL OVER-SUBSCRIPTION OVER DWDM/SONET/SDH OPTICAL TRANSPORT SYSTEMS; and U.S. patent application Ser. No. 10/305,640, filed on Nov. 27, 2002, entitled MULTIPROTOCOL ENCAPSULATION SYSTEM AND METHOD. The contents of these related patent applications are herein incorporated by reference in their entirety for all purposes.

BACKGROUND OF THE INVENTION

The present invention relates to data networking, telecommunication networking, and, in one embodiment, to systems and methods for efficiently aggregating multiple Fibre Channel links.

The Fibre Channel standard defines a bi-directional link protocol, used to connect computers to disk drives and other peripherals. A typical Fibre Channel link may have a bandwidth of 1063 Mbps and a span of up to 10 kilometers.

One typical application of Fibre Channel is interconnecting computer CPUs with arrays of disk drive in large scale computing centers, as would be used in, e.g., financial transaction processing. For reasons of fault tolerance, it is desirable to locate redundant storage resources at remote locations. The advent of high data rate metropolitan optical networks including such networks based on the use of dense wave division multiplexing (DWDM) and/or SONET/SDH transport systems makes it possible to extend so-called storage area networks (SANs) that carry multiple Fibre Channel links over distances much longer than 10 kilometers.

It is useful to apply the widely prevalent Fibre Channel standard to communicate across DWDM networks and therefore minimize the need to redesign computing center equipment. Such DWDM networks can themselves employ protocol such as Gigabit Ethernet, 10 Gigabit Ethernet, SONET, etc. A single wavelength may thus carry e.g., a 1 Gbps data stream, 10 Gbps data stream, etc. Fibre Channel frames may be encapsulated within Gigabit Ethernet frames and/or SONET frames.

However, severe data transport inefficiencies may arise if Fibre Channel links are assigned to, e.g., Gigabit Ethernet links, 10 Gigabit Ethernet links, or STS-48 SONET envelopes based on maximum Fibre Channel throughput. Typically, the momentary aggregate bandwidth of the Fibre Channel links will fall far short of the total of the maximum bandwidths. Therefore, a straightforward mapping of transport network capacities to maximum Fibre Channel demands will result in unused capacity. It would be desirable to use capacity more efficiently and therefore reduce costs by allowing oversubscription to available transport capacity.

One approach to providing Fibre Channel oversubscription is described in U.S. patent application Ser. No. 10/366,867. The approach described therein typically employs an ingress buffer between a set of local Fibre Channel ports and a transport network. The ingress buffer should be as large as the sum of the flow control credit numbers negotiated between the local and remote ports. For certain Fibre Channel port implementations, this credit number may be very large and thus a very large ingress memory is needed. Since this memory should also be high speed, size will come at relatively high cost.

Flow control in this approach is handled by throttling the Fibre Channel ready indications received from the remote ports before forwarding them to the local ports. Since the remote Fibre Channel ports may be quite distant, there may be relatively large latency in communicating the ready indications. The latency involved in operating the flow control mechanism may lead to reduction of throughput.

What is needed are systems and methods for Fibre Channel oversubscription that allow for large flow control credit grants without requiring large ingress memories and that do not introduce excessive latency into flow control operations.

SUMMARY OF THE INVENTION

Oversubscription of Fibre Channel links over a transport network is provided by embodiments of the present invention. A transport interface according to the present invention may maintain a small ingress buffer in addition to the normal egress buffer. The ingress buffer is primarily used for oversubscription and the egress buffer is primarily used for flow control. Ready indications to multiple local Fibre Channel ports may be locally generated when flow control conditions permit and may be distributed among the local Fibre Channel ports in response to preconfigured bandwidth sharing weights. Transport network efficiency is achieved by statistical multiplexing without significant increase in buffer memory requirements or introduction of latency into the flow control mechanism.

One aspect of the present invention provides a method for operating a transport interface to a plurality of local Fibre Channel ports. The method includes locally generating ready indications for the plurality of local Fibre Channel ports and distributing transmission of ready indications among the local Fibre Channel ports responsive to a desired bandwidth sharing.

Further understanding of the nature and advantages of the inventions herein may be realized by reference to the remaining portions of the specification and the attached drawings.

DESCRIPTION OF SPECIFIC EMBODIMENTS

The present invention will be described with reference to a representative application where two or more Fibre Channel links are tunneled through a transport network. In one particular implementation, the transport network is implemented as a metropolitan optical network. Fibre Channel frames are transported through the network encapsulated within packets such as Ethernet packets. Optical network details and the encapsulation details are not germane to the description of the present invention but it will be appreciated that Ethernet packets, e.g., may be carried on optical signals modulated with e.g., 1 Gbps, 2.5 Gbps, or 10 Gbps data waveforms. Also, SONET frames may be used, e.g., instead of Ethernet packets. Multiple optical signals also may share the same fiber by use of wavelength division multiplexing (WDM) techniques.

According to embodiments of the present invention, two or more Fibre Channel links may be multiplexed together over a single transport link such as a Gigabit Ethernet channel, 10 Gigabit Ethernet channel, etc. The combined maximum data rates of the Fibre Channel links may exceed the bandwidth of the transport link. For example, two 1 Gbps Fibre Channel links may share the same Gigabit Ethernet channel. This is possible because the Fibre Channel links do not always operate at their maximum data rate. Thus, statistical multiplexing exploits the relatively low probability of very long bursts and synchronization of bursts among incoming links. Furthermore flow-control ensures that individual bursts or the collective effects of synchronized bursts do not overflow the buffers.

Figure 1:
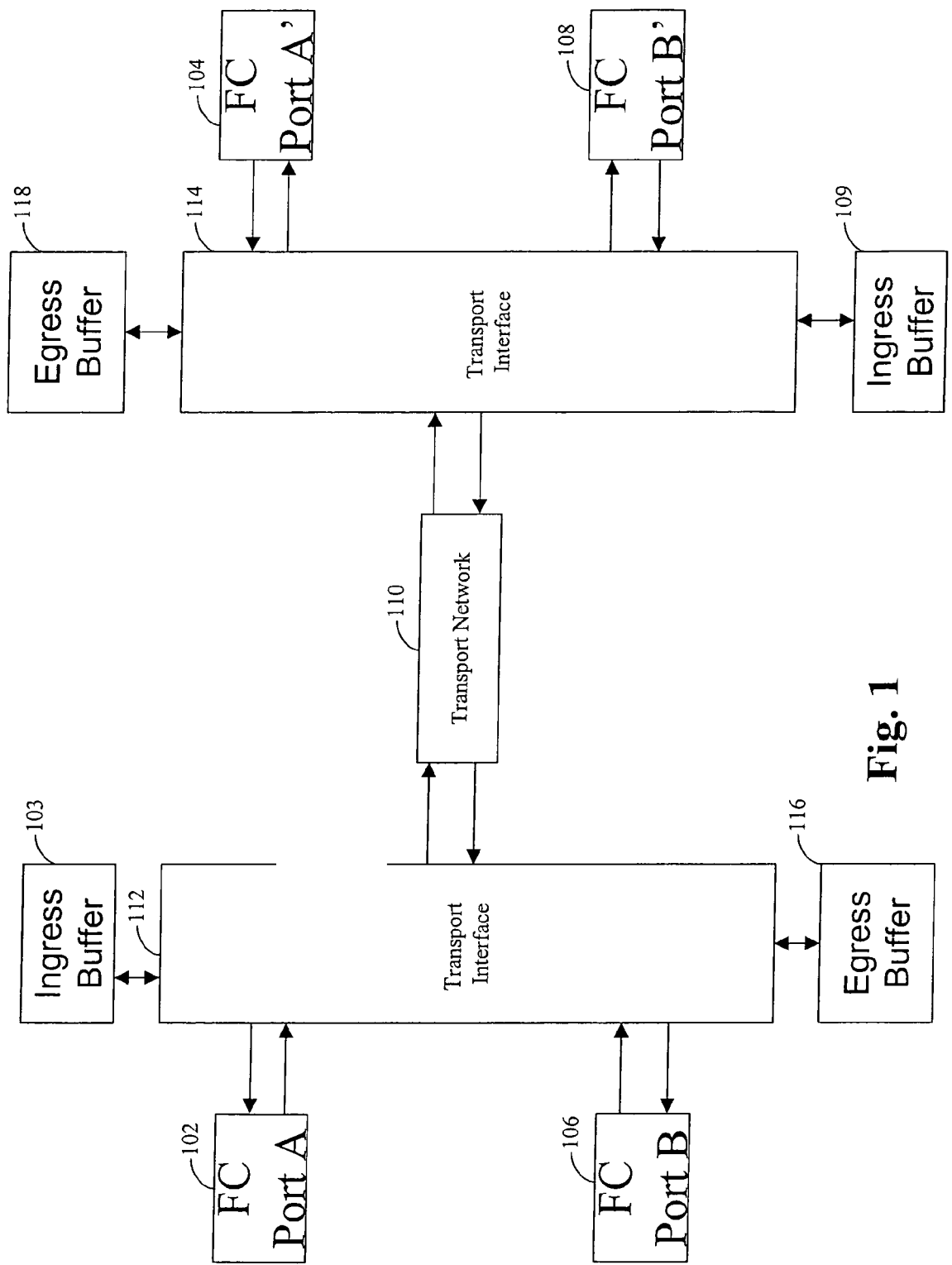
FIG. 1 depicts two Fibre Channel links employing a transport network according to one embodiment of the present invention.

FIG. 1 depicts two Fibre Channel links that are carried through a transport network via transport interfaces according to one embodiment of the present invention. A first Fibre Channel link interconnects Fibre Channel port A 102 and Fibre Channel port A' 104. A second Fibre Channel link connects Fibre Channel port B 106 and Fibre Channel port B' 108. The Fibre Channel ports of each link exchange data and control signals in accordance with the Fibre Channel standard as described in, e.g., "Fibre Channel Framing and Signaling (FC-FS), Rev 1.70," NCITS Working Draft Proposed American National Standard for Information Technology, Feb. 8, 2002, the contents of which are herein incorporated by reference in their entirety for all purposes. The Fibre Channel ports 102, 104, 106, and 108 may provide connectivity to devices such as, e.g., disk drives, disk storage arrays, magnetic tape drives, processing units, printers, etc.

A transport network 110 carries the two Fibre Channel links which as noted above may be combined into the same transport link. The Fibre Channel frames may be encapsulated within packets or frames appropriate to the transport network structure such as Ethernet packets, SONET frames, etc. The Fibre Channel ports 102, 104, 106, and 108 are connected to the transport network 110 via transport interfaces 112 and 114. Transport interfaces 112 and 114 encapsulate and de-encapsulate Fibre Channel frames. Details of encapsulation in one implementation are presented in U.S. patent application Ser. No. 10/305,640. The transport interfaces 112 and 114 perform functions that make it possible for the two Fibre Channel links to share a single transport link.

Transport interfaces 112 and 114 are equipped with egress buffers 116 and 118, respectively. The egress buffers are used to operate a flow control mechanism as will be explained. Transport interfaces 112 and 114 are further equipped with ingress buffers 103 and 109 respectively.

Initial credit for transmission by local Fibre Channel ports is reduced to what can be accommodated in the local ingress buffer. Subsequent grants of credits to local Fibre Channel ports are regulated to take into account available space in the remote egress buffer and the local ingress buffer.

At any moment the outstanding credits are preferably maintained equal to NI+MAX(NI/M, FE) where NI is the space available in the local ingress buffer, M is the oversubscription ratio and FE is the space available in the remote egress buffer. This permits credits to be granted even when there is no space available in the remote egress buffer. Thus instead of allowing at any time an amount of credit to the local transmitter that is based on round trip delay T, credits are granted based on local ingress buffer space and additional credits are issued as soon as a frame is forwarded out of the local ingress buffer without the need to wait for the frame to be forwarded from the remote egress buffer to the remote port.

In accordance with embodiments of the present invention, oversubscription is achieved by transparently enhancing the Fibre Channel flow control mechanisms so that available bandwidth is distributed among links in accordance with configurable sharing weights. Before presenting the modifications in detail, a basic account of Fibre Channel flow control will be helpful.

To prevent overflow of a remote Fibre Channel port's internal buffers, Fibre Channel provides a flow control mechanism that exploits credits. Each credit signifies the remote Fibre Channel port's capacity to accept a new frame. Credits are issued by the recipient to the sender. When the Fibre Channel link is established each port sends an initial buffer_to_buffer credit value to the other port. For each frame sent, the sender decrements the buffer_to_buffer credit by one. A new credit is issued by sending a receive ready indication, "R_RDY," from the receiver to the sender. The sending port increments the buffer_to_buffer credit by one for each ready indication it receives.

According to embodiments of the present invention, the ready indications are generated locally by the transport interface for the attached ports. Each ready indication is generated for a particular one of the local Fibre Channel ports. The distribution of ready indications over the local Fibre Channel ports depends on the configured bandwidth sharing weights.

Flow control between the local transport interface and remote-Fibre Channel ports is maintained on a per-link basis in accordance with the techniques described in U.S. patent application Ser. No. 10/166,213. The remote transport interface maintains an egress buffer having a size proportional to the transport link distance. The local transport interface tracks the availability of space in this buffer per-link by monitoring its own transmissions and extracting reports of newly freed buffer space from encapsulation headers of received frames. Ready indications are transmitted to a local Fibre Channel port only if this tracking process indicates that remote buffer space is available.

U.S. patent application Ser. No. 10/166,213 also describes how Fibre Channel flow control is adapted to regulate transfer of frames from the egress buffer to a local Fibre Channel ports. Embodiments of the present invention employ this technique on a per-link basis. The local transport interface is aware of the initial credit granted by the local Fibre Channel port. Frames transferred from the buffer to the local port are deducted from the credit. Ready indications received from the local port add to the credit. Also, after freeing buffer space, the local transport interface notifies the remote transport interface of the amount freed by encapsulating this information with a Fibre Channel frame.

Because the distance between the local transport interface and any local Fibre Channel port is relatively small, e.g., on the order of a few hundred meters, the ingress buffer can be relatively small. In one implementation, the ingress buffers include storage space to accommodate approximately 8-16 frames of maximum size for each local Fibre Channel port. A useful rule of thumb is that for an 8 Km link operating at approximately 1 Gbps, 8 maximum size frames of buffer space per-port is more than adequate. The ingress buffer space for each port is referred to as BB_CreditH.

A wide range of oversubscription scenarios can be accommodated by embodiments of the present invention. For example, four 1.06 Gbps Fibre Channel links can be accommodated on a single 2.5 Gbps trunk. In another example, two 2.12 Gbps Fibre Channel links can be accommodated over a single 2.5 Gbps trunk. In both of these examples the raw client bandwidth demand is 4.24 Gbps. The latter two link over-subscription example is depicted in FIG. 1.

According to embodiments of the present invention, an operator can configure bandwidth sharing weights among the Fibre Channel links to allocate available transport network capacity during congested conditions. These weights can be configured by entry of input into a terminal local to the transport interface, by use of a remote network management workstation, etc. The weights may also be set automatically based on other configured parameters such as those related to Quality of Service (QoS). In typical implementations, however, a user configures the percentage of trunk bandwidth to be used by each client. There may also be a default configuration where bandwidth is configured equally among clients.

Figure 2:
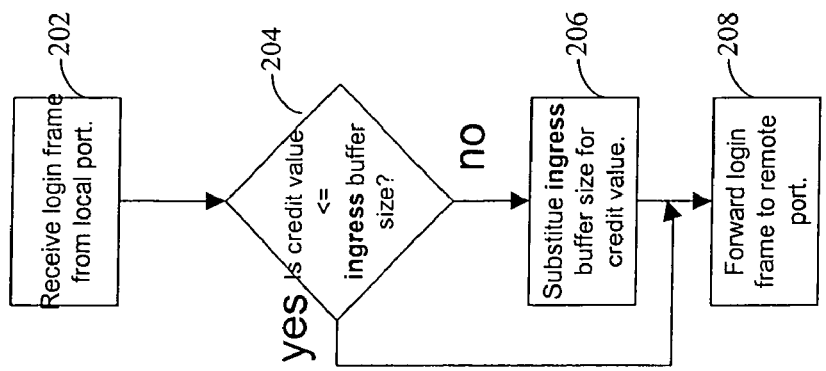
FIG. 2 is a flow chart describing steps of handling a Fibre Channel login frame according to one embodiment of the present invention.

A first step in establishing over-subscription is to intercept the login messages communicated between the Fibre Channel ports at each end of a link to adjust the granted credit to conform to the available transport interface ingress buffer space. FIG. 2 is a flow chart describing steps of handling a Fibre Channel login frame according to one embodiment of the present invention. At step 202, a transport interface (e.g., transport interface 112) receives a Fibre Channel login frame from a local Fibre Channel port (e.g., Fibre Channel port A 102). The login frame will include a buffer-to-buffer credit value that Fibre Channel port A intends to grant to Fibre Channel port A' 104 for flow control purposes. However, here the buffering will take place within ingress buffer 103 rather than at Fibre Channel port A'. The egress buffer 118 is used for operating Fibre Channel flow control across the transport network.

Accordingly, step 204 tests this credit value to see if it is less than or equal to the space (in maximum size frames) reserved for buffering this Fibre Channel link within ingress buffer 103. If the credit value is less than or equal to the available buffer space, BB_CreditH, the login frame is forwarded to Fibre Channel port A' with the credit value unmodified at step 208. If, however, the credit value is greater than the available buffer space, then the credit value is replaced with the BB_CreditH for this link at step 206 prior to forwarding the login frame at step 208. In a symmetric network, ingress buffers 103 and 109 may be of similar size. Also, egress buffers 116 and 118 may be of similar size. Typically for a 1 Gbps Fibre Channel client to transport interface distance of around 8 Kms the ingress buffer can sufficiently large to accommodate the granting of 8 credits to each local port. For a transport distance of 320 Kms, the egress buffers should, for example, accommodate granting of 240 credits.

During operation of the link, ready indications (R_RDYs) will be generated by each transport interface for its local Fibre Channel ports. Ready signals are generated at a rate roughly similar to the frame-carrying capacity of the transport link and distributed among the local ports proportionately to the bandwidth sharing weights with the caveat that a ready signal will be sent to a particular local Fibre Channel port only if flow control operating on its link will allow it. In some implementations, bandwidth left unused by one link due to flow control may be available to other links.

Figure 3B:
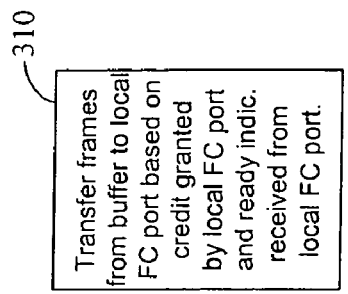
FIG. 3B shows the transfer of frames from a transport interface egress buffer to a local Fibre Channel port according to one embodiment of the present invention.
Figure 3A:
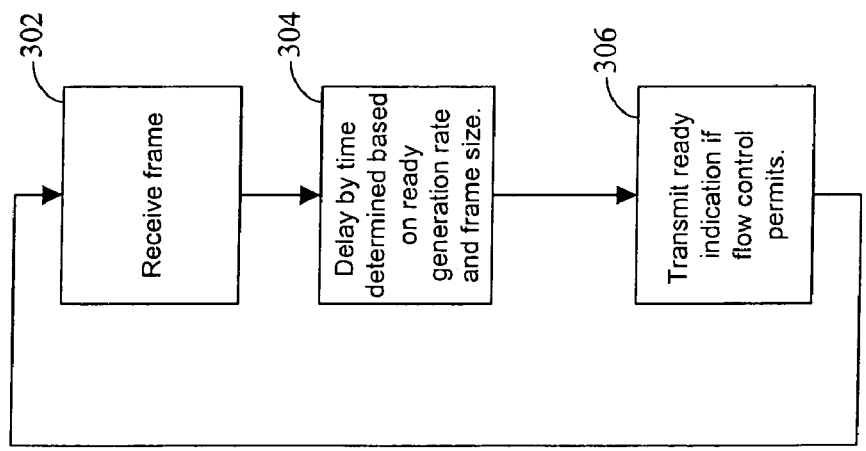
FIG. 3A is a flow chart describing steps of employing a transport interface to locally generate ready indications and distribute them among local Fibre Channel ports according to one embodiment of the present invention.

FIG. 3A depicts steps of generating and distributing ready indications according to one embodiment of the present invention. The steps of FIG. 3A are executed in parallel for each local Fibre Channel port. At a step 302, transport interface 112 receives a frame from the local Fibre Channel port to be relayed to the remote Fibre Channel port via transport network 110 and remote transport interface 114. The frame is encapsulated and relayed to the other side without significant ingress buffering delay. The encapsulation may include information indicating an amount of freed buffer space in egress buffer 116 following transfer of a frame from there to the local Fibre Channel port.

A ready indication is not transmitted back to the local Fibre Channel port immediately. Instead a delay is set at step 304. The delay is determined based on the bandwidth allocated to this Fibre Channel link as indicated by the sharing weight multiplied by the total available transport network bandwidth. For example, the bandwidth allocated to this Fibre Channel link may be 42.5 Megabytes per second. For maximum size Fibre Channel frames (2148 bytes), this corresponds to a ready indication generation rate of 19786 per second. Thus for a maximum sized frame the delay of step 304 is approximately 50 microseconds. However, if the frame is smaller, the ready indication should be sent back sooner. For a 128 byte frame, the ready indication should be sent back after approximately only three microseconds. The delay is set to be the reciprocal of the frame rate permitted by the allocated bandwidth taking into account the frame size of the frame received at step 302.

After the delay of step 304 has concluded, at step 306, a ready indication is sent to the local Fibre Channel port but only if this is permitted by flow control between the transport interfaces. A ready indication is permitted in response to a frame previously transmitted by the local port only if there is understood to be sufficient egress buffer space at remote transport interface 114. To track available remote buffer space, transport interface 112 uses the credit number included in the login frame sent from the other side, history of the number and size of frames previously transmitted, and received indications of freed buffer space at remote transport interface 114. The freed buffer space indications are included in the encapsulation of received Fibre Channel frames.

FIG. 3B illustrates the process of transferring frames from the egress buffer (e.g., egress buffer 116) to the local Fibre Channel port (e.g., Fibre Channel port A 102). A flow control mechanism regulates the transfer of frames from the egress buffer to the local Fibre Channel port at step 310. The operation of this flow control mechanism is based on available credit. As long as there is credit, frames may be transferred to the local port. The initial credit value is the login credit number initially granted by the local port (rather than the one substituted by the transport interface for relaying to the remote transport interface). The credit number is decremented for each frame transferred to the local port and incremented for each ready indication from the local port. When egress buffer space is freed, the amount freed is relayed to the remote transport interface within the encapsulation of a Fibre Channel frame.

It will be appreciated then that bandwidth is saved because there is no need to relay ready indications or Fibre Channel idles. The flow control and over-subscription mechanisms do not require ingress buffering even where distances are long and the Fibre Channel ports grant large credit values. The reduction of ingress memory requirements leads to lower cost and less board area. Also, since the ready indications are generated locally, there is very little latency.

In one particular example, a 2.5 Gbps Gigabit Ethernet transport link is shared among four Fibre Channel links. A link 0 is allocated 20% of the available bandwidth, link 1 20%, link 2 50% and link 3 10%. Accordingly, the raw bandwidth allocated to link 0 is 0.5 Gpbs, link 1 0.5 Gbps, link 3, 1.25 Gbps, and link 3 0.25 Gbps. The Fibre Channel traffic is multiprotocol encapsulated using 32/33 encoding. Thus 1.06 Gbps of Fibre Channel bandwidth is mapped into 1.25 Gpbs of transport bandwidth. The actual bandwidth shares are thus, 0.424 Gbps for link 0, 0.424 Gbps for port 1, and 1.0625 Gbps for port 2, and 0.212 Gbps for port 3. The ready indication generation rates for each port will then based on these bandwidths and the frame size.

Figure 4:
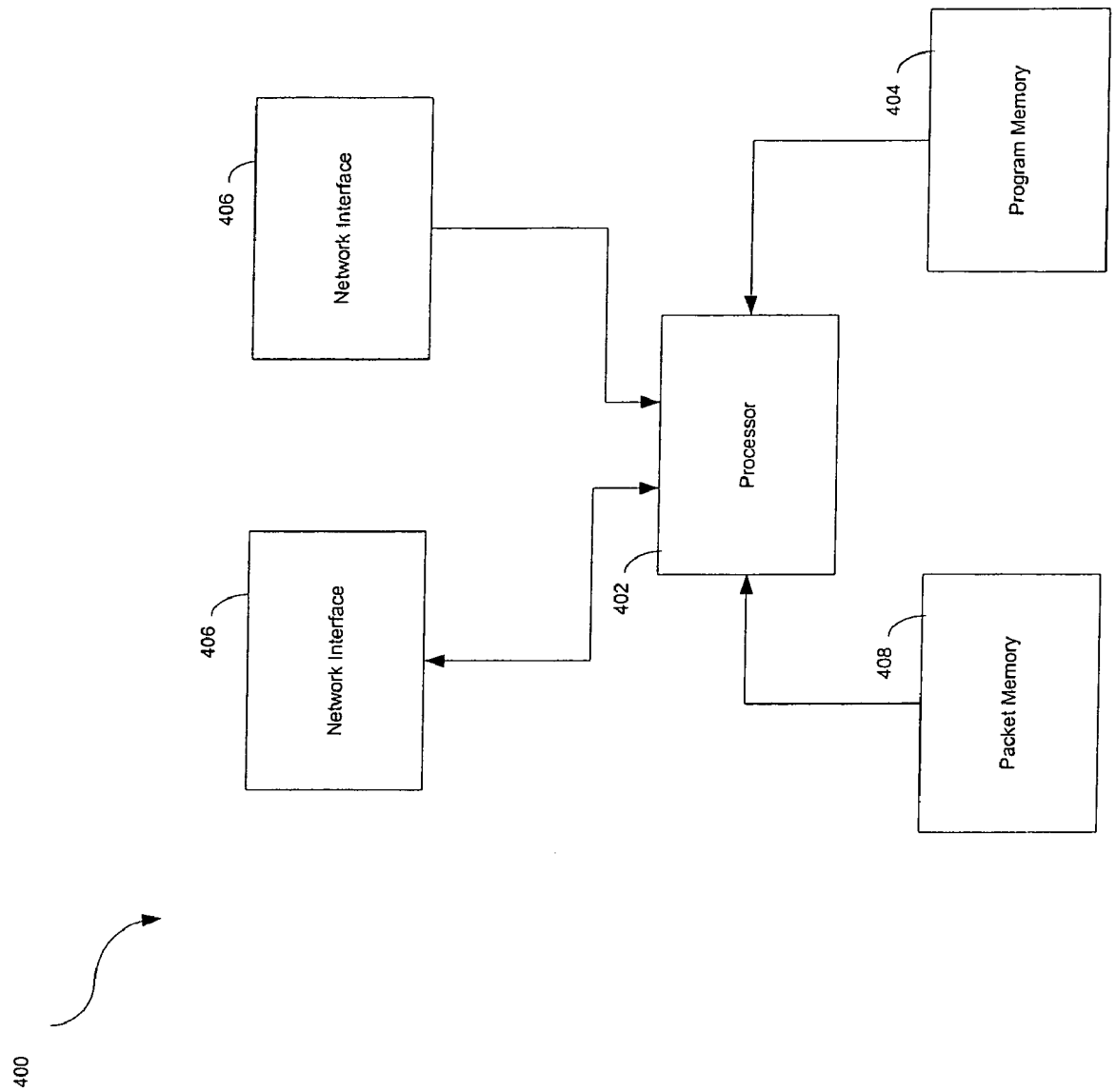
FIG. 4 depicts a network device useful in implementing embodiments of the present invention.

FIG. 4 depicts a network device 400 that may be used to implement, e.g., the transport network interface of FIG. 1 and/or perform any of the steps of FIGS. 2 and 3A-3B. In one embodiment, network device 400 is a programmable machine that may be implemented in hardware, software or any combination thereof. A processor 402 executes code stored in a program memory 404. Processor 402 may perform the encapsulation, de-encapsulation, and flow control operations described above. Program memory 404 is one example of a computer-readable storage medium. Program memory 404 can be a volatile memory. Another form of computer-readable storage medium storing the same codes would be some type of non-volatile storage such as floppy disks, CD-ROMs, DVD-ROMs, hard disks, flash memory, etc.

Network device 400 interfaces with physical media via a plurality of line cards 406. For example, one of line cards 406 may couple to an optical fiber and may incorporate appropriate physical and link layer functionality. In one implementation, there may be a line card for supporting transport links and another line card for connecting to local Fibre Channel ports. The line card for supporting transport links may incorporate a Gigabit Ethernet interface, 10-Gigabit Ethernet interface, a SONET interface, etc. As packets are received, processed, and forwarded by network device 400, they may be stored in a packet memory 408. Packet memory 408 may serve to implement buffers such as buffers 406 and 408. Network device 400 implements all of the network protocols and extensions thereof described above as well as the data networking features provided by the present invention.

The transport interfaces may also be implemented all or in part as ASICs, FPGAs, etc. The egress buffers may employ any type of memory device or circuit such as, e.g., SRAMs. The ingress buffers, if small, can be an integral part of an FPGA used to implement the transport interface. Also ingress and egress buffers can be implemented as a single physical device shared across multiple client devices.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a transport interface to a plurality of local Fibre Channel ports, said method comprising:
   locally generating ready indications for said plurality of local Fibre Channel ports; and
   distributing transmission of said ready indications among said local Fibre Channel ports responsive to a desired bandwidth sharing between Fibre Channel links terminated by said plurality of local Fibre Channel ports;
   wherein said transmission of said ready indications to said local Fibre Channel ports are delayed based on said desired bandwidth sharing, said delay generally equal to the reciprocal of a frame rate permitted by a bandwidth allocated to the Fibre Channel link and based on a frame size of a received frame.

2. The method of claim 1 wherein said ready indications are generated locally within said transport interface.

3. The method of claim 1 further comprising:
   receiving a buffer credit value from a first one of said local Fibre Channel ports;
   modifying said buffer credit value responsive to buffer space within said transport interface; and
   transmitting said modified buffer credit value to a remote Fibre Channel port via a transport network.

4. The method of claim 1 further comprising:
   controlling transmission of said ready indications to said local Fibre Channel ports responsive to availability of buffer space at a remote transport interface.

5. The method of claim 1 further comprising:
   relaying traffic from said plurality of local Fibre Channel ports to a plurality of remote Fibre Channel ports via a transport network; and
   wherein combined maximum data rates of Fibre Channel links terminated by said plurality of Fibre Channel ports through said transport network exceeds bandwidth available via said transport network.

6. The method of claim 5 further comprising:
   suppressing relaying of ready indications from said plurality of remote Fibre Channel ports to said plurality of local Fibre Channel ports.

7. The method of claim 1 wherein said desired bandwidth sharing comprises a default equal sharing of bandwidth among said local Fibre Channel ports.

8. The method of claim 1 further comprising:
   receiving input selecting said desired bandwidth sharing.

9. The method of claim 1 wherein bandwidth unused by one of said Fibre Channel links is available for another of said Fibre Channel links.

10. The method of claim 1 further comprising receiving a login message from a remote channel port and adjusting a granted credit based on available ingress buffer space at the transport interface.

11. A computer-readable medium storing computer-executable instructions for operating a transport interface to a plurality of local Fibre Channel ports, said instructions comprising:
    code that causes local generation of ready indications for said plurality of local Fibre Channel ports;
    code that causes distribution of transmission of said ready indications among said local Fibre Channel ports responsive to a desired bandwidth sharing between Fibre Channel links terminated by said plurality of local Fibre Channel ports; and
    a computer-readable storage medium that stores the codes;
    wherein said transmission of said ready indications to said local Fibre Channel ports are delayed based on said desired bandwidth sharing, said delay generally equal to the reciprocal of a frame rate permitted by a bandwidth allocated to the Fibre Channel link and based on a frame size of a received frame.

12. The computer-readable medium of claim 11 wherein said ready indications are generated locally within said transport interface.

13. The computer-readable medium of claim 11 wherein said instructions further comprise:
    code that causes reception of a buffer credit value from a first one of said local Fibre Channel ports;

code that causes modification of said buffer credit value responsive to buffer space within said transport interface; and code that causes transmission of said modified buffer credit value to a remote Fibre Channel port via a transport network.

14. The computer-readable medium of claim 11 wherein said instructions further comprise:

code that causes control of transmission of said ready indications to said local Fibre Channel ports responsive to availability of buffer space at a remote transport interface.

15. The computer-readable medium of claim 11 wherein said instructions further comprise:

code that causes relaying of traffic from said plurality of local Fibre Channel ports to a plurality of remote Fibre Channel ports via a transport network; and wherein combined maximum data rates of Fibre Channel links terminated by said plurality of Fibre Channel ports through said transport network exceeds bandwidth available via said transport network.

16. The computer-readable medium of claim 15 wherein said instructions further comprise:

code that suppresses relaying ready indications from said plurality of remote Fibre Channel ports to said plurality of local Fibre Channel ports.

17. The computer-readable medium of claim 11 wherein said desired bandwidth sharing comprises a default equal sharing of bandwidth among said local Fibre Channel ports.

18. The computer-readable medium of claim 11 wherein said instructions further comprise:

code that causes receipt of input selecting said desired bandwidth sharing.

19. Apparatus for operating a transport interface to a plurality of local Fibre Channel ports, said apparatus comprising:

means for locally generating ready indications for said plurality of local Fibre Channel ports; and means for distributing transmission of said ready indications among said local Fibre Channel ports responsive to a desired bandwidth sharing between Fibre Channel links terminated by said plurality of local Fibre Channel ports;

wherein said transmission of said ready indications to said local Fibre Channel ports are delayed based on said desired bandwidth sharing, said delay generally equal to the reciprocal of a frame rate permitted by a bandwidth allocated to the Fibre Channel link and based on a frame size of a received frame.

20. Apparatus for operating a transport interface to a plurality of local Fibre Channel ports, said apparatus comprising:

an integrated circuit or plurality of integrated circuits that locally generate ready indications for said plurality of local Fibre Channel ports, distribute transmission of said ready indications among said local Fibre Channel ports responsive to a desired bandwidth sharing between Fibre Channel links terminated by said plurality of local Fibre Channel ports, and delay said transmission of said ready indications to said local Fibre Channel ports based on said desired bandwidth sharing, said delay generally equal to the reciprocal of a frame rate permitted by a bandwidth allocated to the Fibre Channel link and based on a frame size of a received frame.

21. The apparatus of claim 20 wherein said ready indications are transmitted to the local Fibre Channel ports only if permitted by flow control between the transport interface and a remote transport interface.

22. The apparatus of claim 20 further comprising an ingress buffer configured for use in oversubscription and an egress buffer configured for use in flow control.

* * * * *